(12) United States Patent
Rico Alvarino et al.

(10) Patent No.: US 12,301,349 B2
(45) Date of Patent: May 13, 2025

(54) CELL-SPECIFIC REFERENCE SIGNAL (CRS) RATE MATCHING IN MULTI-RADIO ACCESS TECHNOLOGY (RAT) NETWORKS

(71) Applicant: QUALCOMM INCORPORATED, San Diego, CA (US)

(72) Inventors: Alberto Rico Alvarino, San Diego, CA (US); Kazuki Takeda, Tokyo (JP); Changhwan Park, San Diego, CA (US); Peter Gaal, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 472 days.

(21) Appl. No.: 17/679,389

(22) Filed: Feb. 24, 2022

(65) Prior Publication Data

US 2022/0385394 A1 Dec. 1, 2022

Related U.S. Application Data

(60) Provisional application No. 63/193,047, filed on May 25, 2021.

(51) Int. Cl.
*H04L 1/00* (2006.01)
*H04L 5/00* (2006.01)
*H04W 72/23* (2023.01)

(52) U.S. Cl.
CPC .......... *H04L 1/0013* (2013.01); *H04L 5/0051* (2013.01); *H04W 72/23* (2023.01)

(58) Field of Classification Search
CPC ................. H04L 1/0013; H04L 5/0051; H04L 1/0045; H04L 1/1812; H04L 1/0067; H04L 5/0094; H04L 5/005; H04L 5/0023; H04W 72/23; H04B 7/02
USPC ......................................................... 370/329
See application file for complete search history.

(56) References Cited

U.S. PATENT DOCUMENTS

| | | | |
|---|---|---|---|
| 11,856,562 B2 * | 12/2023 | Takeda | H04L 5/001 |
| 2020/0145166 A1 * | 5/2020 | Yum | H04L 5/0048 |
| 2020/0367212 A1 * | 11/2020 | Maaref | H04L 5/0053 |

(Continued)

FOREIGN PATENT DOCUMENTS

WO    WO-2020197481 A1 * 10/2020    ........ H04W 56/0015

*Primary Examiner* — Rownak Islam
(74) *Attorney, Agent, or Firm* — Haynes and Boone LLP

(57) ABSTRACT

Mechanisms for rate matching a downlink communication channel in a multi-radio access technology (RAT) communication scenario are described. In one aspect, a method for wireless communication performed by a base station (BS) includes rate matching, based on a rate matching pattern indicating a plurality of reserved resource elements, a downlink (DL) communication channel. The method further includes transmitting, to a user equipment (UE) on one or more antenna ports, a DL communication in the rate matched DL communication channel. The method further includes transmitting, on the one or more antenna ports, one or more signals in the plurality of reserved resource elements. The one or more signals transmitted in the plurality of reserved resource elements may allow UEs associated with other RATs to estimate the rate matched DL communication channel.

18 Claims, 11 Drawing Sheets

(56) References Cited

U.S. PATENT DOCUMENTS

2021/0050889 A1* 2/2021 Park ..................... H04B 7/0626
2022/0330045 A1* 10/2022 He ........................ H04L 5/0051

* cited by examiner

CELL-SPECIFIC REFERENCE SIGNAL (CRS) RATE MATCHING IN MULTI-RADIO ACCESS TECHNOLOGY (RAT) NETWORKS

CROSS-REFERENCE TO RELATED APPLICATIONS

The present application claims the benefit of and priority to U.S. Provisional Patent Application No. 63/193,047, filed May 25, 2021, the entirety of which is incorporated by reference herein.

TECHNICAL FIELD

This application relates to wireless communication systems, and more particularly to wireless communications in multi-radio access technology (RAT) communication networks.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In some aspects, NR and LTE base stations BSs may be co-deployed in a region, and may serve a plurality of respective UEs. Further, in some aspects, a UE may have dual connectivity with an NR BS and an LTE BS to enhance performance and optimize the use of available network resources. In some aspects, an NR BS and a UE may be configured to use dynamic spectrum sharing (DSS) to share an available spectrum and dynamically modify the assigned bandwidth for each radio access technology (RAT) based on their respective traffic conditions. One challenge for NR and LTE coexistence is the difference in reference signal configurations for each RAT. For example, LTE may have "always on" reference signals, which cannot be turned off, and may result in increased interference for neighboring NR cells using the same spectrum.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present disclosure describes mechanisms for rate matching a DL channel in a first radio access technology (RAT), while allowing for UEs associated with a second RAT to determine interference in the rate matched DL channel. In some aspects, the rate matching mechanisms described herein include rate matching a DL channel around one or more reserved REs, transmitting a DL communication in the rate matched DL channel, and transmitting one or more additional signals in the reserved REs. The additional signals may be generated and transmitted using a same transmit configuration used for the DL communication on the rate matched DL channel. In this regard, a BS may transmit the DL communication and the one or more additional signals in the reserved REs using a same set of one or more antenna ports. Because the DL communication and the additional signals in the reserved REs are transmitted using the same antenna port(s), a UE attempting to estimate the channel can more correctly determine the interference in the reserved REs.

One aspect of the present disclosure includes a method for wireless communication performed by a base station (BS). The method includes: rate matching, based on a rate matching pattern indicating a plurality of reserved resource elements, a downlink (DL) communication channel; transmitting, to a user equipment (UE) on one or more antenna ports, a DL communication in the rate matched DL communication channel; and transmitting, on the one or more antenna ports, one or more signals in the plurality of reserved resource elements.

One aspect of the present disclosure includes a method for wireless communication performed by a user equipment (UE). The method includes: receiving, from a base station (BS), a first configuration indicating a rate matching pattern including one or more reserved resource elements; receiving, from the BS, a second configuration indicating a type of the rate matching pattern; receiving, based on the rate matching pattern in a shared downlink (DL) communication channel, a DL communication; and decoding the dl communication based on the second configuration.

One aspect of the present disclosure includes a base station (BS). The BS includes a processor configured to rate match, based on a rate matching pattern indicating a plurality of reserved resource elements, a downlink (DL) communication channel. The BS further includes a transceiver configured to transmit, to a user equipment (UE) on one or more antenna ports, a DL communication in the rate matched DL communication channel; and transmit, on the one or more antenna ports, one or more signals in the plurality of reserved resource elements.

One aspect of the present disclosure includes a user equipment (UE). The UE includes a transceiver configured to: receive, from a base station (BS), a first configuration indicating a rate matching pattern including one or more reserved resource elements; receive, from the BS, a second configuration indicating a type of the rate matching pattern; and receive, based on the rate matching pattern in a shared downlink (DL) communication channel, a DL communication. The UE further includes a processor configured to decode the DL communication based on the second configuration.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
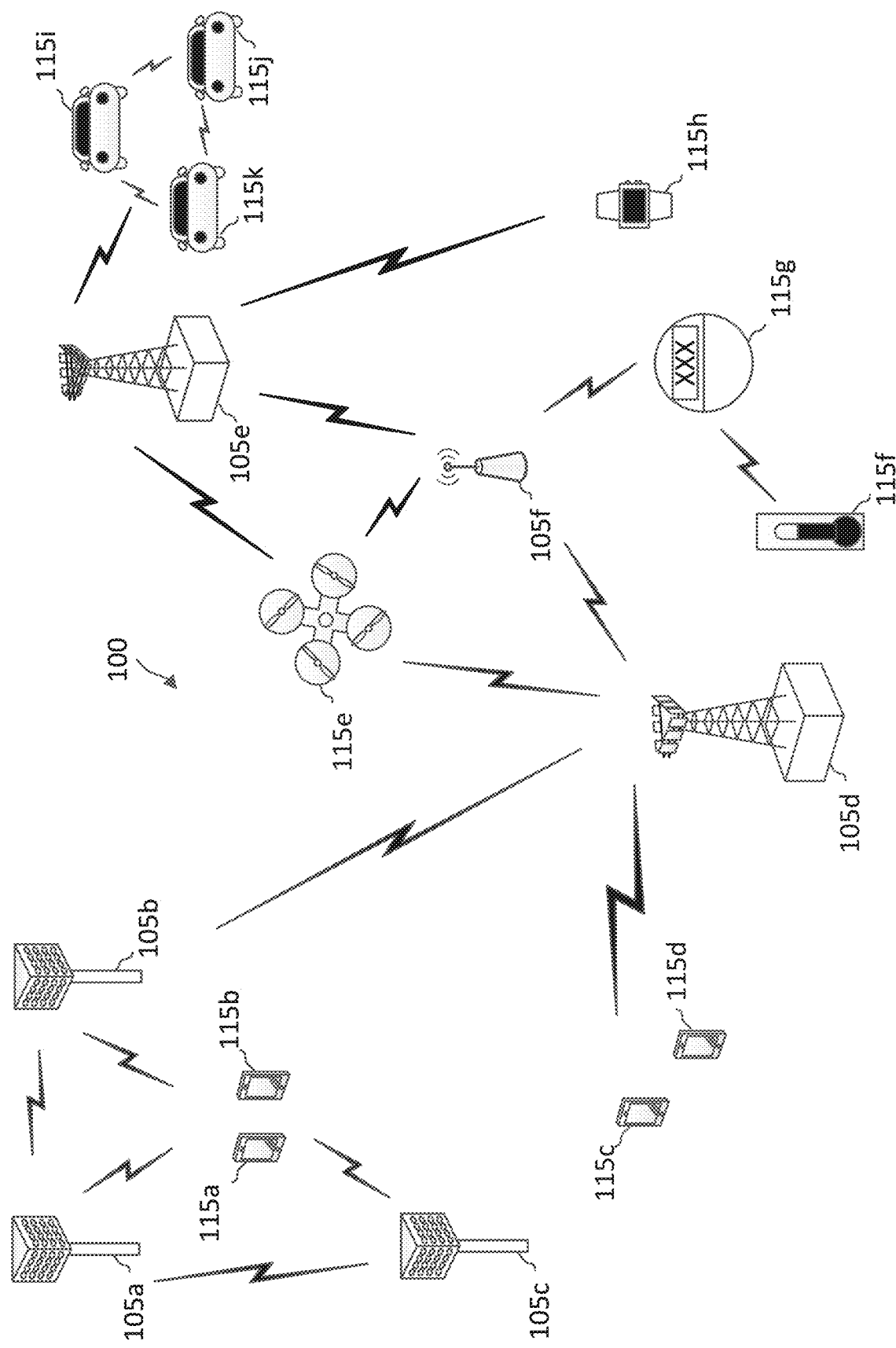
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including time-stringent control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into multiple different frequency ranges, a frequency range one (FR1), a frequency range two (FR2), and FR2x. FR1 bands include frequency bands at 7 GHz or lower (e.g., between about 410 MHz to about 7125 MHz). FR2 bands include frequency bands in mmWave ranges between about 24.25 GHz and about 52.6 GHz. FR2x bands include frequency bands in mmWave ranges between about 52.6 GHz to about 71 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for rate matching a shared DL channel, such as a PDSCH, in a multi-radio access technology (RAT) communication scenario. In some instances, a BS associated with a first RAT (e.g., NR) may be co-deployed with a BS associated with a second RAT (e.g., LTE). In some aspects, an NR UE may be configured for dual communication with both an NR BS and a LTE BS. The UE may be served by one master node, and one or more secondary nodes. In the dual connectivity mode, the UE may operate in a shared frequency spectrum occupied by the LTE cell. The UE and NR BS may use spectrum sharing mechanisms (e.g., listen before talk (LBT) procedures) to acquire resources in the shared spectrum. However, the LTE cell may have one or more "always-on" signals, such as the LTE primary synchronization signal (PSS), secondary synchronization signal (SSS), physical broadcast channel (PBCH), and cell-specific reference signal (CRS). These always-on signals may result in increased interference with the NR downlink channels, causing degraded performance.

One approach to address this issue is to use CRS rate matching techniques to rate match a DL channel (e.g., NR PDSCH) around the resource elements (REs) associated with the LTE CRS. The REs the NR devices rate match around may be referred to as reserved REs. The NR BS may instruct the UE to also rate match the received DL channel around the reserved REs to reduce or eliminate the effect of the CRS interference on the UE performance. However, while this approach may be effective for NR UEs, rate matching the DL channel around the LTE CRS may cause an issue for the LTE UEs. In particular, for example, the LTE UEs may be configured to monitor for and determine interference from the NR BS in the CRS REs to obtain a covariance matrix of the noise and interference. The covariance matrix can be used to determine a receive spatial filter (e.g., least-squares (LS), Kalman filter (KF), minimum mean square error (MMSE)). However, since the NR BS rate matches the DL channel around the CRS REs, the LTE UE will experience or observe a mismatch in the interference in the CRS REs versus the DL channel REs. This mismatch in the interference can degrade the performance of the LTE UE, since the receive filter can be determined based on a mismatched covariance matrix.

Accordingly, the present disclosure describes mechanisms for rate matching a DL channel to allow for LTE UEs to more accurately determine interference in the rate matched DL channel. In some aspects, the rate matching mechanisms described herein include rate matching a DL channel around one or more reserved REs, transmitting a DL communication in the rate matched DL channel, and transmitting one or more additional signals in the reserved REs. The additional signals may include IQ symbols generated using a same transmit configuration used for the DL communication on the rate matched DL channel. In this regard, a BS may transmit the DL communication and the one or more additional signals in the reserved REs using a same set of one or more antenna ports. Because the DL communication and the additional signals in the reserved REs are transmitted using the same antenna port(s), the LTE UE can more correctly determine the interference in the reserved REs to obtain a covariance matrix that is not mismatched. By obtaining a correct covariance matrix, and subsequently a correct spatial filter, the decoding and demodulation of the received LTE signals may be improved. The improved decoding and demodulation of the received LTE signals may benefit the LTE UE's connectivity and performance.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105$d$ and 105$e$ may be regular macro BSs, while the BSs 105$a$-105$c$ may be macro BSs enabled with one of three dimension (3D), full dimension (FD), or massive MIMO. The BSs 105$a$-105$c$ may take advantage of their higher dimension MIMO capabilities to exploit 3D beamforming in both elevation and azimuth beamforming to increase coverage and capacity. The BS 105$f$ may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115$a$-115$d$ are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115$e$-115$h$ are examples of various machines configured for communication that access the network 100. The UEs 115$i$-115$k$ are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105$a$-105$c$ may serve the UEs 115$a$ and 115$b$ using 3D beamforming and coordinated spatial techniques, such as coordinated multipoint (CoMP) or multi-connectivity. The macro BS 105$d$ may perform backhaul communications with the BSs 105$a$-105$c$, as well as small cell, the BS 105$f$. The macro BS 105$d$ may also transmits multicast services which are subscribed to and received by the UEs 115$c$ and 115$d$. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support time-stringent communications with ultra-reliable and redundant links for time-stringent devices, such as the UE 115$e$. Redundant communication links with the UE 115$e$ may include links from the macro BSs 105$d$ and 105$e$, as well as links from the small cell BS 105$f$. Other machine type devices, such as the UE 115$f$ (e.g., a thermometer), the UE 115$g$ (e.g., smart meter), and UE 115$h$ (e.g., wearable device) may communicate through the network 100 either directly with BSs, such as the small cell BS 105$f$, and the macro BS 105$e$, or in multi-step-size configurations by communicating with another user device which relays its information to the network, such as the UE 115$f$ communicating temperature measurement information to the smart meter, the UE 115$g$, which is then reported to the network through the small cell BS 105$f$. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115$i$, 115$j$, or 115$k$ and other UEs 115, and/or vehicle-to-infrastructure (V2I) communications between a UE 115$i$, 115$j$, or 115$k$ and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames.

A radio frame may be divided into a plurality of subframes or slots, for example, about 10. Each slot may be further divided into transmission time intervals (TTIs). In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network. In some aspects, the network 100 may utilize shared channel access mechanisms (e.g., LBT) for sharing a radio channel among multiple BSs 105 and/or UEs 115 of different network operating entities and/or different radio access technologies (RATs). For example, one or more of the UEs 115 may operate in a dual connectivity mode such that the UEs 115 are served by at least on NR BS 105, and at least one LTE BS 105.

Figure 2:
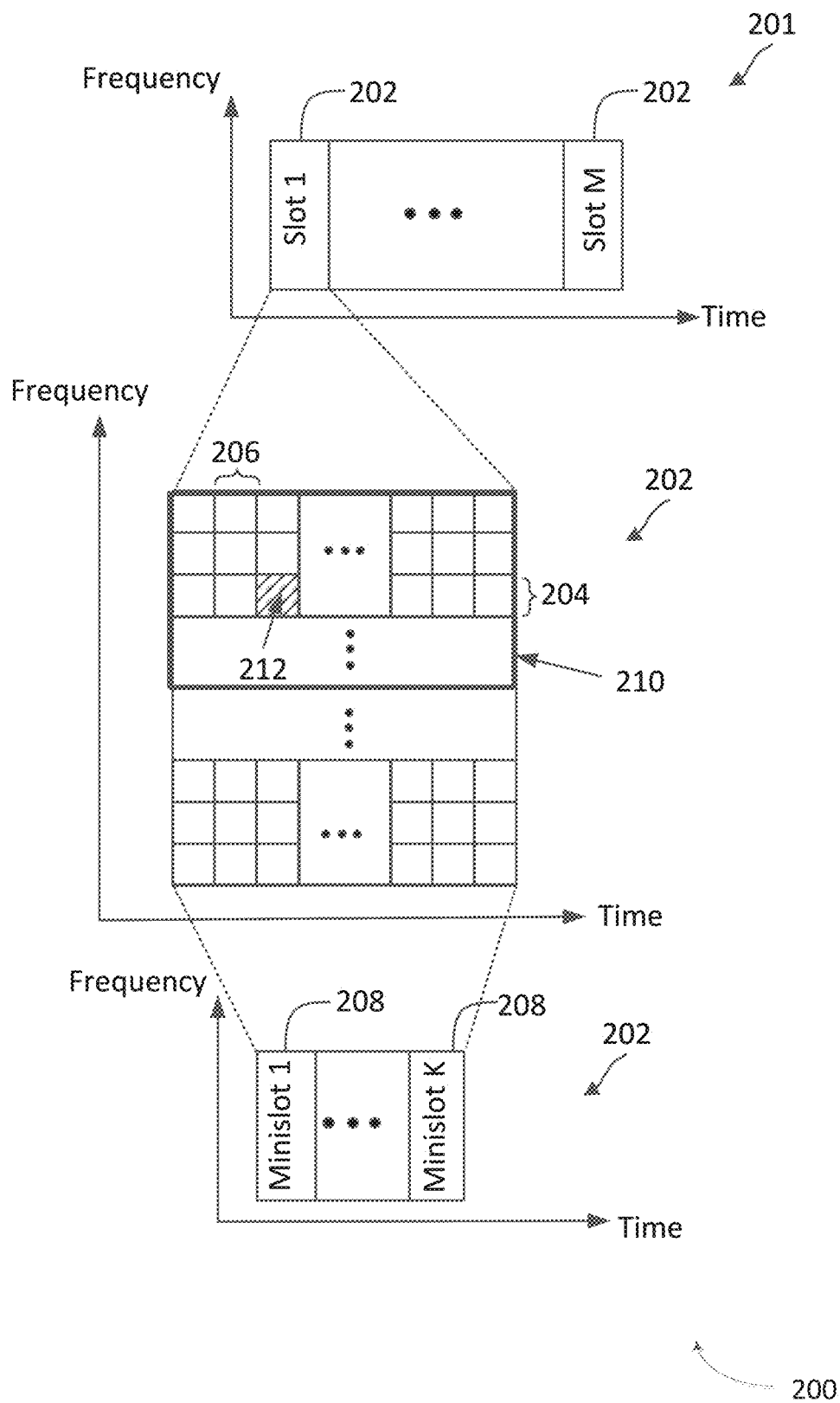
FIG. 2 illustrates a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or TTIs 208. Each slot 202 may be time-partitioned into K number of TTIs 208. Each TTI 208 may include one or more symbols 206. The TTIs 208 in a slot 202 may have variable lengths. For example, when a slot 202 includes N number of symbols 206, a TTI 208 may have a length between one symbol 206 and (N−1) symbols 206. In some aspects, a TTI 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
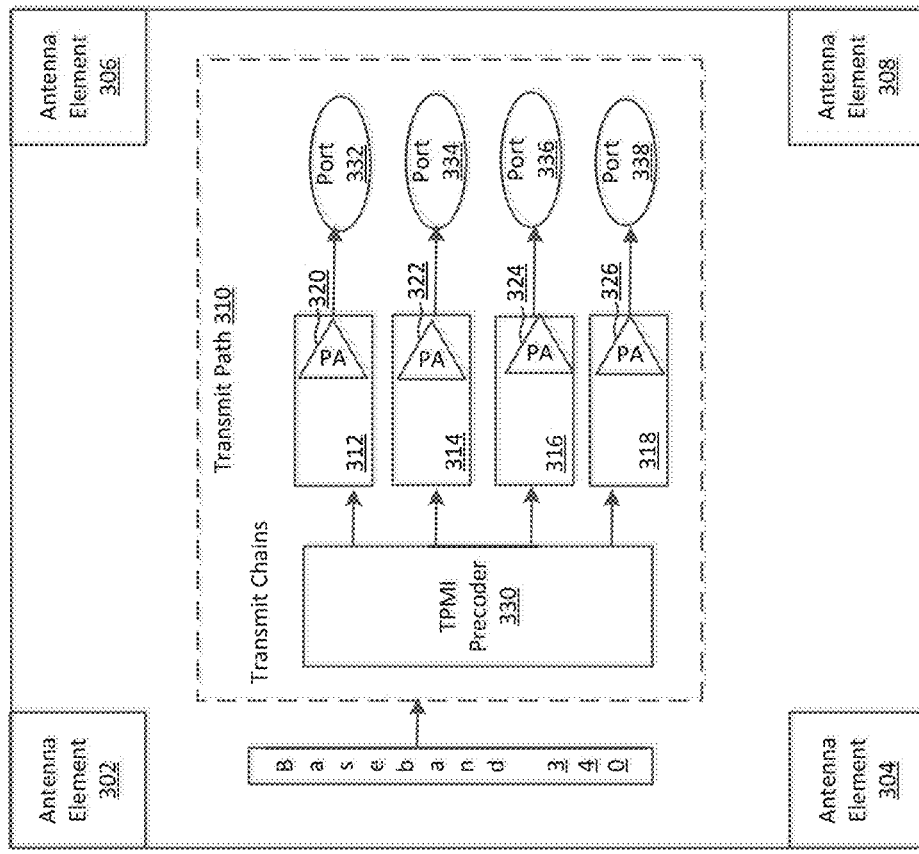
FIG. 3 illustrates an example base station (BS) configured to transmit DL communications and signals using a plurality of antenna ports, according to some aspects of the present disclosure.

FIG. 3 illustrates a BS 305 configured to transmit DL communications and signals using a plurality of antenna ports, according to some aspects of the present disclosure. The BS 305 may be similar to the BSs 105 in FIG. 1 in the network 100. The BS 305 includes antenna elements 302, 304, 306, and 308. An antenna element may also be referred to as an antenna, an antenna port, or a port. However, it will be understood that an antenna port may be associated with a plurality of antenna elements, and vice versa. For example, the BS 305 may be configured to use beamforming techniques, including using a plurality of antenna elements to transmit a DL communication associated with one or more antenna ports in a beam direction. Although the BS 305 is illustrated as having four antenna elements, it should be understood that in other examples, the BS 305 may include fewer antenna elements (e.g., 1, 2, or 3) or more antenna elements (e.g., 5, 6, 7, 8, etc.). A communication channel between a pair of nodes (e.g., a BS and a UE) includes not only the physical channel, but also radio frequency (RF) transceiver chains, for example, including antennas, low-noise amplifiers (LNAs), mixers, RF filters, and analog-to-digital (A/D) converters, and in-phase quadrature-phase (I/Q) imbalances. These parameters and components may be different between different nodes and/or different antennas.

In the example illustrated in FIG. 3, the antenna elements 302, 304, 306, and 308 are located on different edges of the BS 305, thus creating diversity and providing for directional communication. The BS 305 may use at least one of the antenna elements 302, 304, 306, and/or 308 to transmit communication signals (e.g., CRS) to enable a UE (e.g., UE 115) to estimate a DL channel. The BS 305 includes a baseband 340 and a transmit path 310 for DL transmissions using one or more antenna elements. The baseband 340 may perform data encoding, cyclic-prefix (CP)-OFDM and/or discrete Fourier transform-spread-fast Fourier transform (DFT-s-FFT) modulation to generate a baseband signal. The transmit path 310 includes four transmit chains 312, 314, 316, and 318. Although the BS 305 is illustrated as having four transmit chains, it should be understood that in other examples, the BS 305 may include fewer transmit chains (e.g., 1, 2, or 3) or more transmit chains (e.g., 5, 6, 7, 8, etc.).

Each transmit chain may include a digital-to-analog converter (DAC), a mixer, and a power amplifier that converts a baseband signal to a radio frequency (RF) signal for transmission. For example, transmit chain 312 includes a power amplifier 320, transmit chain 314 includes a power amplifier 322, transmit chain 316 includes a power amplifier 324, and transmit chain 318 includes a power amplifier 326. Additionally, RF chains may be routed to multiple antennas, including all of the antennas, through phase shifters and/or switches. A transmit chain may also refer to an RF chain.

The BS 305 may sound a port 332, 334, 336, and/or 338 by sending a reference signal using a combination of transmit chains. The ports 332, 334, 336, and/or 338 may or may not have a one-to-one mapping to the antenna elements 302, 304, 306, and/or 308. When there is a one-to-one mapping, each antenna element 302, 304, 306, and/or 308 may map to one of the ports 332, 334, 336, and/or 338. When the ports 332, 334, 336, and/or 338 are logical ports or virtual ports, the UE may configure the transmit chains differently for different ports to produce signals with different powers and/or different direction. However, each logical port may be linked to or associated with more than one antenna element, in some instances. The BS 305 can report a composite of the signals from the transmit chains to the UE as a virtual port by applying a transmit precoding matrix indicator (TPMI) precoder 330. Although the TPMI precoder 330 is illustrated in relation to the transmit chains, the TPMI precoder 330 may be applied in the baseband 340.

Figure 4:
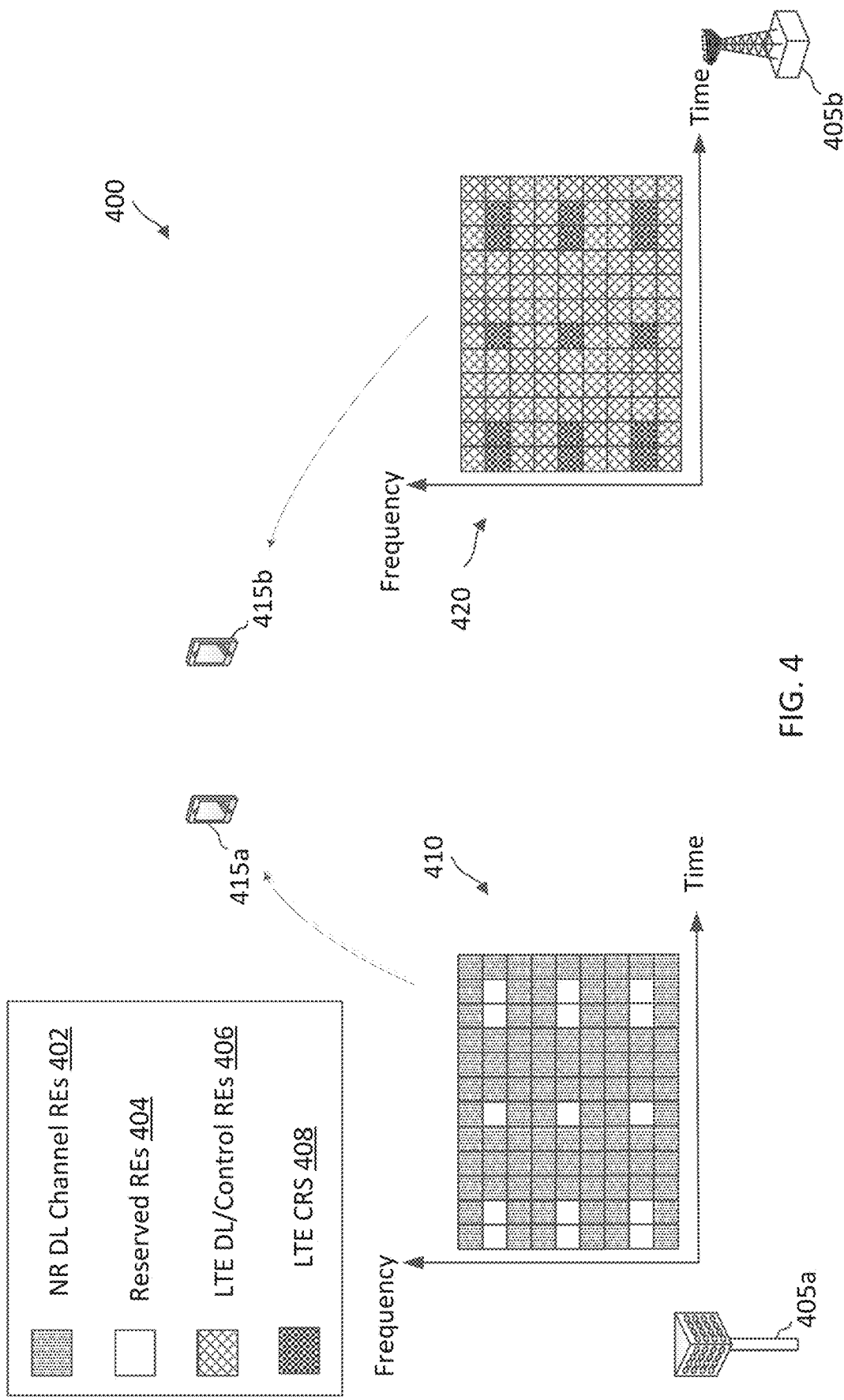
FIG. 4 illustrates a multi-radio access technology (RAT) communication scenario, according to some aspects of the present disclosure.

FIG. 4 illustrates a multi-radio access technology (RAT) communication scenario 400, according to some aspects of the present disclosure. In the scenario 400, a first BS 405a associated with a first RAT communicates with a first UE 415a also associated with the first RAT. Further, a second BS 405b associated with a second RAT communicates with a second UE 415b also associated with the second RAT. Each of the BSs 405a, 405b may be one of the BSs 105 in the network 100 shown in FIG. 1. In an exemplary aspect the first RAT may be 5G NR, and the second RAT may be LTE. Accordingly, the first BS 405a and the first UE 415a may have a first wireless communication configuration, and the second BS 405b and the second UE 415b may have a second wireless communication configuration. The BSs 405a, 405b and the UEs 415a, 415b operate in a co-deployment scenario in which multiple RATs are present. For example, the first UE 415a and/or the second UE 415b may be configured for dual connectivity such that they are served by an NR cell and an LTE cell. In some aspects, the scenario 400 may be performed in an unlicensed or shared frequency band (e.g., NR-U). Although the first BS 405a and the second BS 405b are shown separately, it will be understood that, in some aspects, the first BS 405a and the second BS 405b may be in a same location.

In the scenario 400, the first BS 405a is configured to transmit DL communications in a first shared DL channel 410 including a plurality of resource elements (REs), and the second BS 405b is configured to transmit DL communications in a second shared DL channel 420 including a plurality of REs 406. The first and second shared DL channels 410, 420 may occupy a same band or set of frequencies. The shared DL channels 410, 420 may be PDSCHs, in some aspects. Further, the wireless communication configuration of the second RAT may include one or more "always-on" signals, such as cell-specific reference signals (CRSs) 408. The always-on signals may be periodic and associated with a particular pattern or set of time/frequency resources. Because the periodic signals cannot be turned off, other devices operating in the network, such as the first UE 415a, may experience interference from these signals. This interference may cause degraded performance of the first UE 415a since the first UE 415a observes greater interference in the symbols in which the CRSs are transmitted from the second BS 405b.

To address this interference from the CRSs 408, the first BS 405a is configured to rate match the DL channel around the REs associated with the CRSs 408. The REs that the first BS 405a rate matches around may be referred to as reserved REs 404, or "cleaned" REs. The first BS 405a configures the first UE 415a to rate match the received DL channel 410 around the reserved REs 404 on the receiver side as well. Accordingly, the first BS 405a is configured to transmit, and the first UE 415a is configured to receive, DL communications in the rate matched DL channel REs 402, such that the CRSs 408 transmitted by the second BS 405b do not interfere with the DL channel REs 402.

Although the rate matching scheme shown in FIG. 4 may reduce interference for the first UE 415a associated with the first RAT, the rate matching may result in a different issue for the second UE 415b. In particular, the second UE 415b may be configured to monitor for and determine interference from the first BS 405a in the DL channel 410, including the reserved REs 404, to obtain a covariance matrix of the noise and interference. The covariance matrix can be used to determine a receive spatial filter (e.g., minimum mean square error (MMSE)). However, since the first BS 405a rate matches the DL channel 410 around the reserved REs 404, the second UE 415b will experience or observe a mismatch in the interference in the reserved REs 404 versus the DL channel REs 402. This mismatch in the interference can degrade the performance of the second UE 415b, since the receive filter may be determined based on a mismatched covariance matrix.

In this regard, the present disclosure describes schemes and mechanisms to allow the first BS 405a to rate match the DL channel 410 around the CRSs 408, while assisting UEs of the second RAT (e.g., the second UE 415b) in estimating interference to determine a covariance matrix. In particular, the schemes and methods 500, 600, 700 described with respect to FIGS. 5-7 include rate matching a DL channel around one or more REs associated with always-on channels of another RAT, and transmitting additional symbols in the reserved REs resulting from the rate matching. In some aspects, the first BS 405a may generate and transmit the additional signals using a same transmit configuration (e.g., precoding matrix, power configuration, and/or antenna port(s)) used to generate the DL communication signal in the DL channel 410. The additional signals may be referred to as quadrature signals, or IQ signals or symbols. Accordingly, the second UE 415b and/or other UEs associated with the second RAT can more accurately determine an appropriate covariance matrix and spatial filter for the current network conditions since all the signals in the monitored channel, including the IQ signals transmitted in the reserved REs, are encoded, modulated, and/or otherwise prepared using the same transmit configuration.

Figure 5:
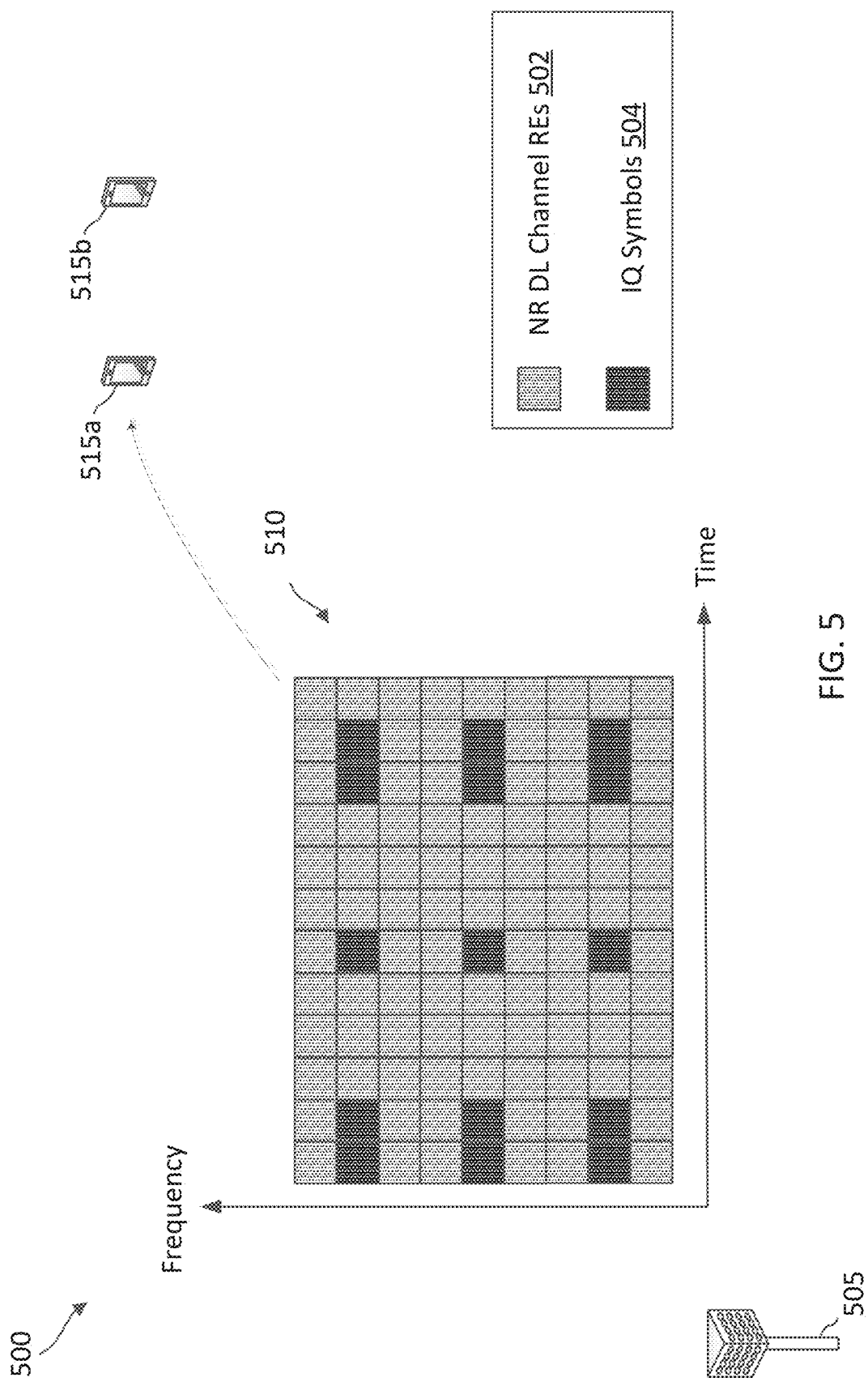
FIG. 5 illustrates a multi-RAT rate matching scheme, according to some aspects of the present disclosure.

FIG. 5 illustrates a multi-RAT rate matching scheme 500, according to some aspects of the present disclosure. In the scheme 500, a BS 505 associated with a first RAT communicates with a first UE 515a also associated with the first RAT. A second UE 515b associated with the second RAT may be within a range of the BS 505 such that the second UE 515b receives interference from the BS 505. The BS 505 may be one of the BSs 105 in the network 100 shown in FIG.

1, and each of the UEs 515a, 515b may be one of the UEs 115 in the network 100. In an exemplary aspect the first RAT may be 5G NR, and the second RAT may be LTE. In some aspects, the scheme 500 may be performed in an unlicensed or shared frequency band (e.g., NR-U).

The BS 505 is configured to rate match and transmit a shared DL channel 510, which includes a plurality of DL channel REs 502, and a plurality of signals 504. The plurality of signals 504 may be referred to as additional signals, quadrature signals or IQ symbols. In particular, the BS 505 is configured to rate match around one or more always-on signals associated with a different second RAT, such as LTE. In an exemplary aspect, the BS 505 may be configured to rate match the shared DL channel 510 around one or more REs associated with CRSs transmitted by a different BS associated with the second RAT. Further, the BS 505 is configured to transmit, in the reserved or cleaned REs resulting from the rate matching, the one or more signals 504. As mentioned above, the BS 505 is configured to transmit the one or more signals 504 in the reserved REs using a same antenna port as the DL channel REs 502. In some instances, an antenna port may be described or defined such that the channel over which a symbol on the antenna port is conveyed can be inferred from the channel over which another symbol on the same antenna port is conveyed. For example, the BS 505 may use a same transmit configuration, including a precoding matrix and power configuration, to prepare the DL channel REs 502 and the signals 504. In some aspects, the BS 505 may include the BS 305, and may use one or more of the mechanisms described above with respect to FIG. 3 to prepare and/or transmit the DL channel REs 502 and the signals 504.

In some instances, the first UE 515a may not decode, measure, or otherwise use the signals 504. In other words, in some instances, the first UE 515a may ignore the signals 504, and decode only the rate matched DL channel 510, including the REs 502. Accordingly, the signals 504 may be any suitable signals with any suitable modulation, and may carry any suitable data, provided that the signals 504 are transmitted using the same antenna ports as the rate matched DL channel 510. The BS 505 may transmit, to the first UE 515a, a rate matching configuration instructing the UE 515a to ignore the signals 504. In some aspects, the BS 505 may indicate, to the first UE 515a, a type of the rate matching pattern used, where the type of the rate matching pattern indicates how the first UE 515a is to use the signals 504, if at all. For example, the BS 505 may transmit the rate matching pattern in a RRC message, where a field of the RRC message indicates the rate matching pattern type. The rate matching pattern may be additionally or alternatively indicated by a DCI scheduling the shared channel, or by a MAC control element (MAC-CE). Accordingly, the UE 515a may determine, based on the rate matching pattern type, whether and how to use the signals 504. For example, as described further below, the first UE 515a may use the signals 504 to estimate the shared DL channel 510, or to decode the shared DL channel. For example, in some aspects, the signals 504 may include a repetition of one or more symbols of the shared DL channel 510 to provide for improved decoding of the shared DL channel 510.

Figure 6:
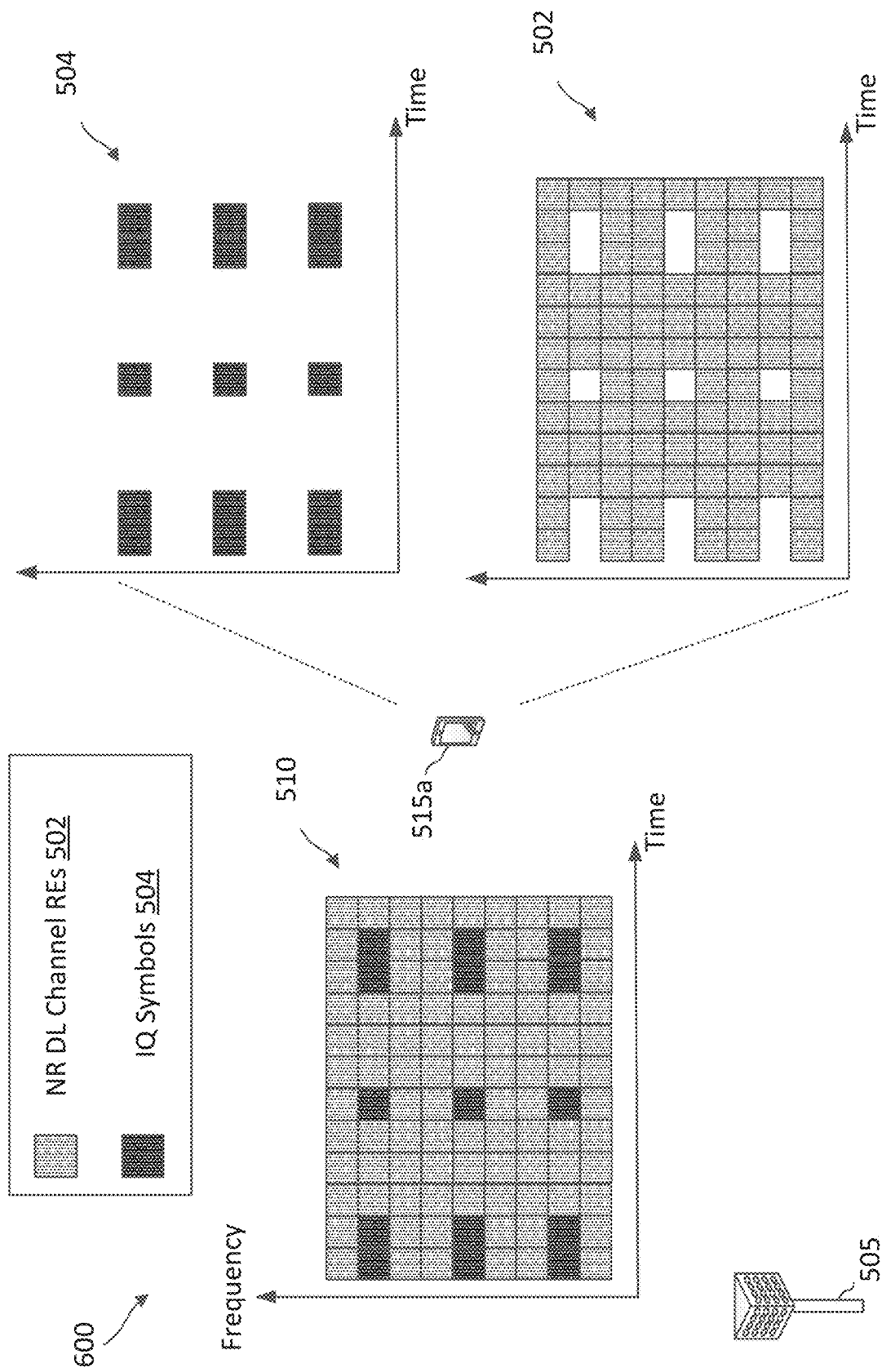
FIG. 6 illustrates a multi-RAT rate matching scheme, according to some aspects of the present disclosure.

FIG. 6 illustrates a multi-RAT rate matching scheme 600, according to some aspects of the present disclosure. In the scheme 600, a BS 505 associated with a first RAT communicates with a first UE 515a also associated with the first RAT. The BS 505 may be one of the BSs 105 in the network 100 shown in FIG. 1, the BS 305, or the BS 405a. The UE 515a may be one of the UEs 115 in the network 100 or the UE 415a. In an exemplary aspect the first RAT may be 5G NR, and the BS 505 may be co-deployed with one or more LTE cells in a region. In some aspects, the scheme 600 may be performed in an unlicensed or shared frequency band (e.g., NR-U). In the scheme 600 shown in FIG. 6, the first UE 515a rate matches a received DL channel around one or more reserved REs, as similarly described above in the scheme 500. However, in the scheme 600, the first UE 515a also receives and processes the additional signals 504 transmitted by the BS 505 in the reserved REs 502, so that the additional signals can be used by the first UE 515a for channel estimation and/or DL data decoding.

As similarly described above in FIG. 5, the BS 505 rate matches a shared DL channel 510 around a plurality of symbols associated with one or more always-on signals from a neighboring cell or BS associated with a different RAT. In particular, the BS 505 rate matches the shared DL channel 510 based on a CRS configuration or pattern from a neighboring LTE cell. The BS 505 also generates or prepares additional signals 504. The additional signals 504 may be referred to as IQ symbols. The BS 505 transmits a DL communication including a plurality of DL channel REs 502 in the rate matched DL channel 510, and transmits the additional signals 504 in the reserved REs resulting from rate matching the DL channel 510. As explained above, the BS 505 transmits the DL channel REs 502 and the additional signals 504 in one or more same antenna ports. Transmitting the DL channel REs 502 and the additional signals 504 in the same one or more antenna ports may include applying a same transmit configuration (e.g., precoding matrix, power configuration) for the DL channel REs 502 and the additional signals 504. The UE 515a receives the DL communication including the plurality of DL channel REs 502, and the additional signals 504. The UE 515a decodes the DL communication including the plurality of DL channel REs 502.

As shown in FIG. 6, the UE 515a may be configured to receive the additional signals (IQ symbols) 504, and use the additional signals 504 for one or more steps, such as estimating the DL channel or decoding the DL communication. In this regard, the BS 505 may transmit a rate matching configuration indicating a type of rate matching pattern. The BS 505 may indicate a first type of rate matching pattern, which indicates to the UE 515a to rate match around the reserved REs. The BS 505 may indicate a second rate matching pattern which indicates to the UE 515a to rate match around the reserved REs, and also indicates a type and/or structure of the additional signals 504. For example, the second rate matching pattern type may specify the sequence or type of the additional signals 504. For example, the rate matching pattern type or configuration may indicate that the additional signals 504 are reference signals (e.g., demodulation signals) which can be used by the UE 515a for channel estimation and/or demodulation, or that the additional signals 504 are some other type of signal. In one aspect, the UE 515a may be configured to estimate the channel using a weighting algorithm that takes into account the relatively lower reliability of the additional signals 504 for channel estimation due to CRS interference from neighboring cells. In another aspect, the UE 515a may be configured to apply a log likelihood ratio (LLR) scaling in a demodulation algorithm to demodulate the signals of the channel 510. In another aspect, the rate matching configuration may indicate that the additional signals 504 include repeated REs from the DL channel 510. For example, the additional signals 504 may include repeats of one or more REs preceding each respective additional signal.

Figure 7:
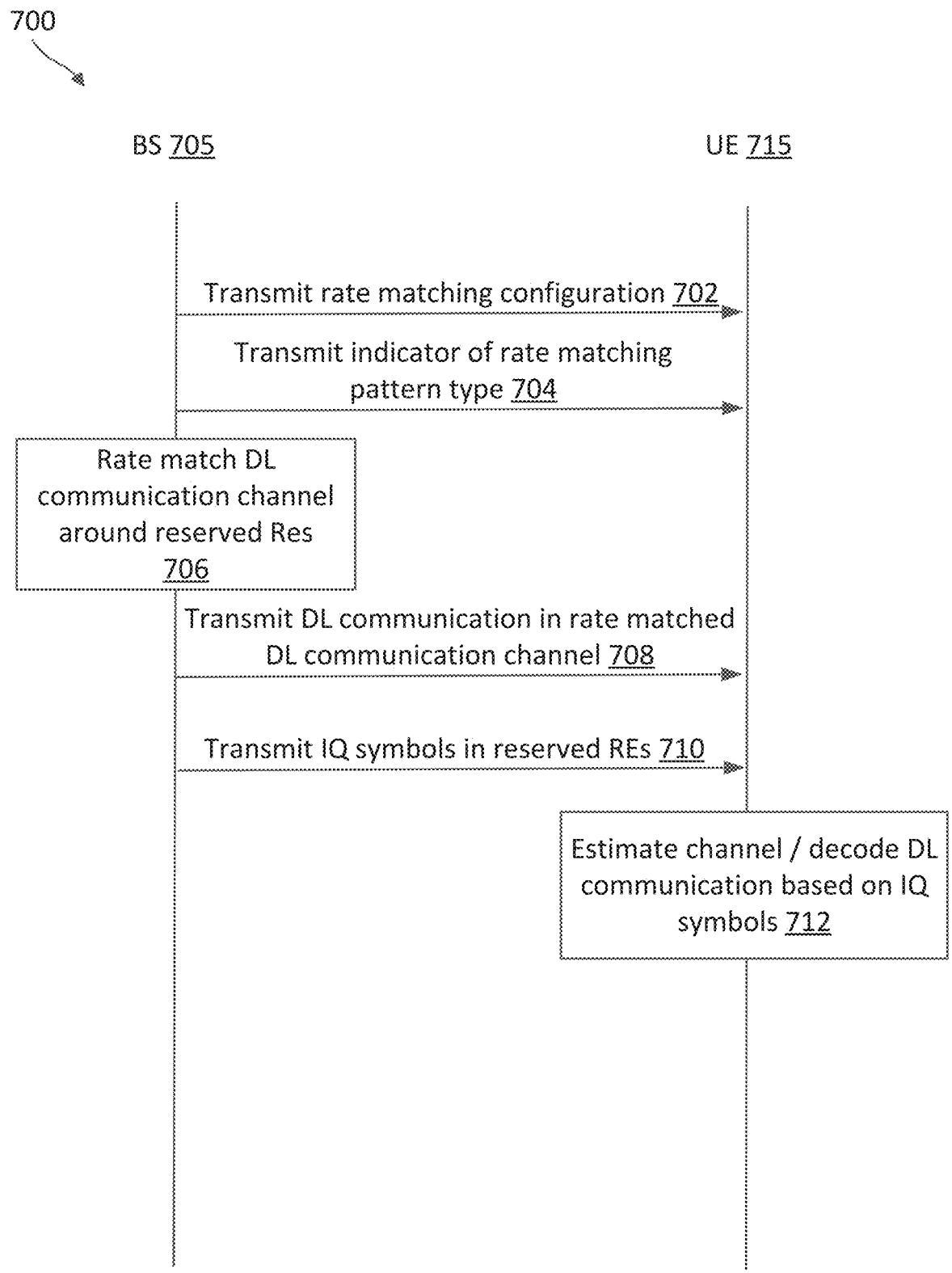
FIG. 7 is a signaling diagram illustrating a method for rate matching a shared DL channel in a multi-RAT communication scenario, according to some aspects of the present disclosure.

FIG. 7 is a signaling diagram illustrating a method 700 for rate matching a shared DL channel in a multi-RAT communication scenario, according to some aspects of the present disclosure. In the method 700, a BS 705 associated with a first RAT communicates with a UE 715 also associated with the first RAT. The BS 705 may be one of the BSs 105 in the network 100 shown in FIG. 1, the BS 305, the BS 405a, and/or the BS 505. The UE 715 may be one of the UEs 115 in the network 100, the UE 415a, or the UE 515a. In an exemplary aspect the first RAT may be 5G NR, and the BS 705 may be co-deployed with one or more neighboring LTE cells. In some aspects, the method 700 may be performed in an unlicensed or shared frequency band (e.g., NR-U). As illustrated, the method 700 includes a number of enumerated steps, but aspects of the method 700 may include additional steps before, after, and in between the enumerated steps. In some aspects, one or more of the enumerated steps may be omitted or performed in a different order.

At action 702, the BS 705 transmits, and the UE 715 receives, a rate matching configuration. The rate matching configuration may include a rate matching pattern indicating one or more REs for rate matching a shared DL channel, such as a PDSCH. In some aspects, the BS 705 transmits the rate matching configuration using RRC signaling or messages. The rate matching configuration may be additionally or alternatively indicated by a DCI scheduling the shared channel, or by a MAC-CE. For example, the BS 705 may configure the UE 715 semi-statically by indicating the reserved REs associated with the CRSs. In some aspects, the rate matching configuration indicates the LTE carrier bandwidth and frequency-domain location, an LTE MBSFN subframe configuration, the number of LTE CRS antenna ports associated with the reserved REs, and the LTE CRS shift. The LTE CRS shift may provide the exact frequency-domain position of the LTE CRS.

At action 704, the BS 705 transmits, and the UE 715 receives, an indicator of a type of the rate matching pattern indicated at action 702. In this regard, the rate matching pattern may be associated with a first type or a second type. If the BS 705 indicates the first type of rate matching pattern, the UE 715 may be configured to ignore any signals in the reserved REs. In some aspects, the BS 705 may transmit the indicator of the rate matching pattern type using RRC signaling. The rate matching pattern type may be additionally or alternatively indicated by a DCI scheduling the shared channel, or by a MAC-CE. In some aspects, actions 702 and 704 may be performed in a single step. For example, the BS 705 may transmit one or more RRC messages indicating the rate matching pattern and the and the type of the rate matching pattern.

At action 706, the BS 705 rate matches a DL communication channel (e.g., PDSCH) around one or more reserved REs. The one or more reserved REs may be associated with one or more always on signals from a neighboring cell associated with a different RAT. In an exemplary aspect, the BS 705 may rate match the DL communication channel based on a CRS configuration of the neighboring cell.

At action 708, the BS 705 transmits, and the UE 715 receives, a DL communication in the rate matched DL communication channel. The DL communication channel may include a PDSCH. The DL communication may include DL data, and may be associated with one or more transport blocks (TBs) that can be decoded by the UE 715. The BS 705 transmits the DL communication in one or more antenna ports. The BS 705 may transmit the DL communication in the one or more antenna ports based on a transmit configuration. The transmit configuration may include a precoding matrix and a power configuration.

At action 710, the BS 705 transmits, and the UE 715 receives, in one or more reserved REs resulting from the rate matching, one or more additional signals. The one or more additional signals may be referred to as IQ symbols, in some aspects. The one or more additional signals, or IQ symbols, may include reference signals that can be used by the UE 715 for channel estimation and/or demodulation. In another aspect, the one or more additional signals may include a repetition of a DL communication. In another aspect, the one or more additional signals may not be associated with a specific reference signal structure used by the UE 715. In this regard, the one or more additional signals may be a dummy signal that is prepared and transmitted using a same antenna port as the DL communication channel (e.g., PDSCH). The BS 705 may transmit the one or more additional signals in the same one or more antenna ports used at action 708. Accordingly, the BS 705 may use the same transmit configuration to prepare and transmit the DL communication in the rate matched DL communication channel, and the one or more additional signals. Further, in some aspects, actions 708 and 710 may be part of a single transmission including the DL communication and the one or more additional signals. Accordingly, the UE 715 may receive, based on a same set of one or more antenna ports, both the DL communication and the one or more additional signals in the reserved REs. The location of the reserved REs may be indicated to the UE using RRC signaling as explained above, where one or more RRC messages indicate the time/frequency resources or location of the reserved REs.

At action 712, the UE 715 estimates the DL communication channel and/or decodes the DL communication based on the one or more additional signals transmitted in the reserved REs. For example, as described above, the UE 715 may estimate the channel using a weighting algorithm that takes into account the fact that the additional signals (transmitted and received at action 710) are less reliable for estimating channel estimation due to CRS interference from neighboring cells. In another aspect, the UE 715 may be configured to apply a LLR scaling in a demodulation algorithm to demodulate the signals of the DL communication channel. In another aspect, the rate matching configuration may indicate that the additional signals (transmitted and received at action 710) include repeated REs from the DL communication channel. For example, the additional signals may include repetitions of one or more REs preceding each respective additional signal.

Figure 8:
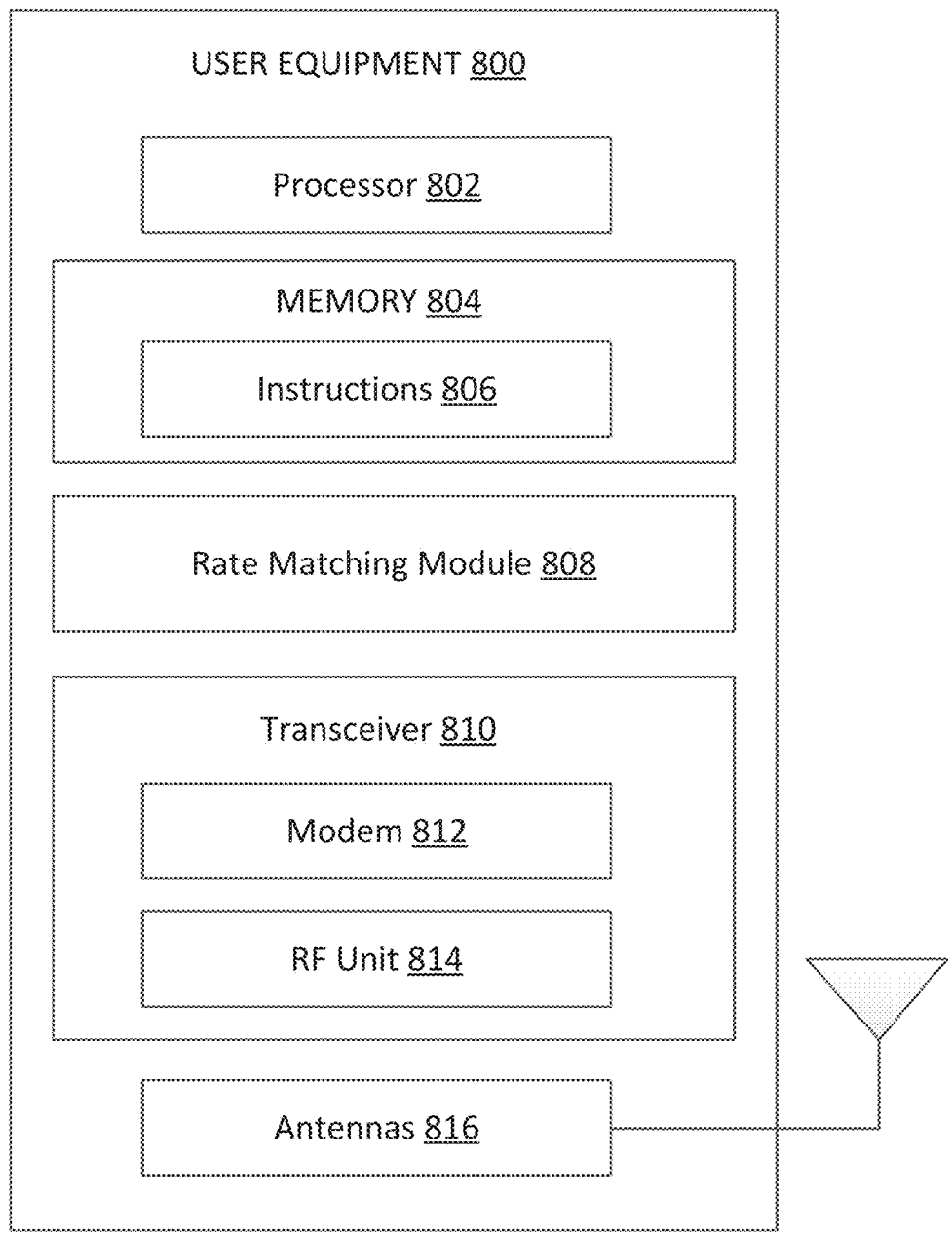
FIG. 8 is a block diagram of a user equipment (UE) according to some aspects of the present disclosure.

FIG. 8 is a block diagram of an exemplary UE 800 according to some aspects of the present disclosure. The UE 800 may be a UE 115 discussed above in FIG. 1. As shown, the UE 800 may include a processor 802, a memory 804, an Rate matching module 808, a transceiver 810 including a modem subsystem 812 and a radio frequency (RF) unit 814, and one or more antennas 816. These elements may be coupled with one another. The term "coupled" may refer to directly or indirectly coupled or connected to one or more intervening elements. For instance, these elements may be in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 804 includes a non-transitory computer-readable medium. The memory 804 may store, or have recorded thereon, instructions 806. The instructions 806 may include instructions that, when executed by the processor 802, cause the processor 802 to perform the operations described herein with reference to the UEs 115 in connection with aspects of the present disclosure, for example, aspects of FIGS. 3-7 and 11. Instructions 806 may also be referred to as program code. The program code may be for causing a wireless communication device to perform these operations, for example by causing one or more processors (such as processor 802) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The Rate matching module 808 may be implemented via hardware, software, or combinations thereof. For example, the Rate matching module 808 may be implemented as a processor, circuit, and/or instructions 806 stored in the memory 804 and executed by the processor 802. In some instances, the Rate matching module 808 can be integrated within the modem subsystem 812. For example, the Rate matching module 808 can be implemented by a combination of software components (e.g., executed by a DSP or a general processor) and hardware components (e.g., logic gates and circuitry) within the modem subsystem 812.

The Rate matching module 808 may be used for various aspects of the present disclosure, for example, aspects of aspects of FIGS. 3-7 and 11. The Rate matching module 808 is configured to receive, from a BS, a first configuration indicating a rate matching pattern including one or more reserved resource elements. In some aspects, the Rate matching module 808 may be configured to receive one or more RRC messages including a rate matching configuration, where the rate matching configuration indicates the rate matching pattern. For example, the RRC message may indicate that the rate matching pattern is for LTE CRS rate matching and may indicate the frequency and/or time resources associated with the CRS signals. In some aspects, the Rate matching module 808 may be configured to receive, from the BS, a second configuration indicating a type of the rate matching pattern. In some aspects, the Rate matching module 808 may be configured to receive, from the BS, one or more RRC messages indicating the type of the rate matching pattern. For example, an RRC message may include a field indicating whether the rate matching pattern is a first type or a second type. In some aspects, the Rate matching module 808 is configured to determine, based on the rate matching pattern type, whether and how to use the one or more signals.

The Rate matching module 808 may be further configured to receive, based on the rate matching pattern in a shared DL communication channel, a DL communication. The DL communication channel may be a PDSCH. The PDSCH may be rate matched around one or more reserved REs, as explained above. The one or more reserved REs may be associated with LTE CRS from a neighboring cell. In some aspects, the Rate matching module 808 may be configured to receive one or more additional signals in the reserved REs. The additional signals may include reference signals, and the Rate matching module 808 may use the reference signals to estimate the DL communication channel. In another example, the one or more additional signals may include a repetition of a portion of the DL communication. For example, the one or more signals may include a repeat of one or more REs in the DL communication channel that precede the reserved REs.

The Rate matching module 808 may be further configured to decode the DL communication based on the second configuration described above. For example, the Rate matching module 808 may receive one or more signals including a repeat of a portion of the DL communication, as explained above. In some aspects, the repeat of the portion of the DL communication may include one or more parity bits that can be used by the UE to decode the DL communication. The Rate matching module 808 may determine to use the one or more parity bits based on the type of the rate matching pattern indicated in the second configuration. For example, the second configuration may indicate, to the UE 800, that the rate matching pattern has a second type. The Rate matching module 808 may then determine, based on the second type of the rate matching pattern, to use the parity bits to decode the DL communication in the received PDSCH.

As shown, the transceiver 810 may include the modem subsystem 812 and the RF unit 814. The transceiver 810 can be configured to communicate bi-directionally with other devices, such as the BSs 105. The modem subsystem 812 may be configured to modulate and/or encode the data from the memory 804 and/or the Rate matching module 808 according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., PUCCH control information, PRACH signals, PUSCH data) from the modem subsystem 812 (on outbound transmissions) or of transmissions originating from another source such as another UE 115 or a BS 105. RF unit 814 can include circuitry such as analog to digital converters, digital to analog converters, filters, amplifiers, etc. The RF unit 814 may be further configured to perform analog beamforming in conjunction with the digital beamforming. Although shown as integrated together in transceiver 810, the modem subsystem 812 and the RF unit 814 may be separate devices that are coupled together at the UE 115 to enable the UE 115 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices. The antennas 816 may provide the received data messages for processing and/or demodulation at the transceiver 810. The transceiver 810 may provide the demodulated and decoded data (e.g., DCI, SSBs, RMSI, MIB, SIB, FBE configuration, PRACH configuration PDCCH, PDSCH, RRC configurations and messages) to the Rate matching module 808 for processing. The antennas 816 may include multiple antennas of similar or different designs in order to sustain multiple transmission links. The RF unit 814 may configure the antennas 816.

In an aspect, the UE 800 can include multiple transceivers 810 implementing different RATs (e.g., NR and LTE). In an aspect, the UE 800 can include a single transceiver 810 implementing multiple RATs (e.g., NR and LTE). In an aspect, the transceiver 810 can include various components, where different combinations of components can implement different RATs.

Figure 9:
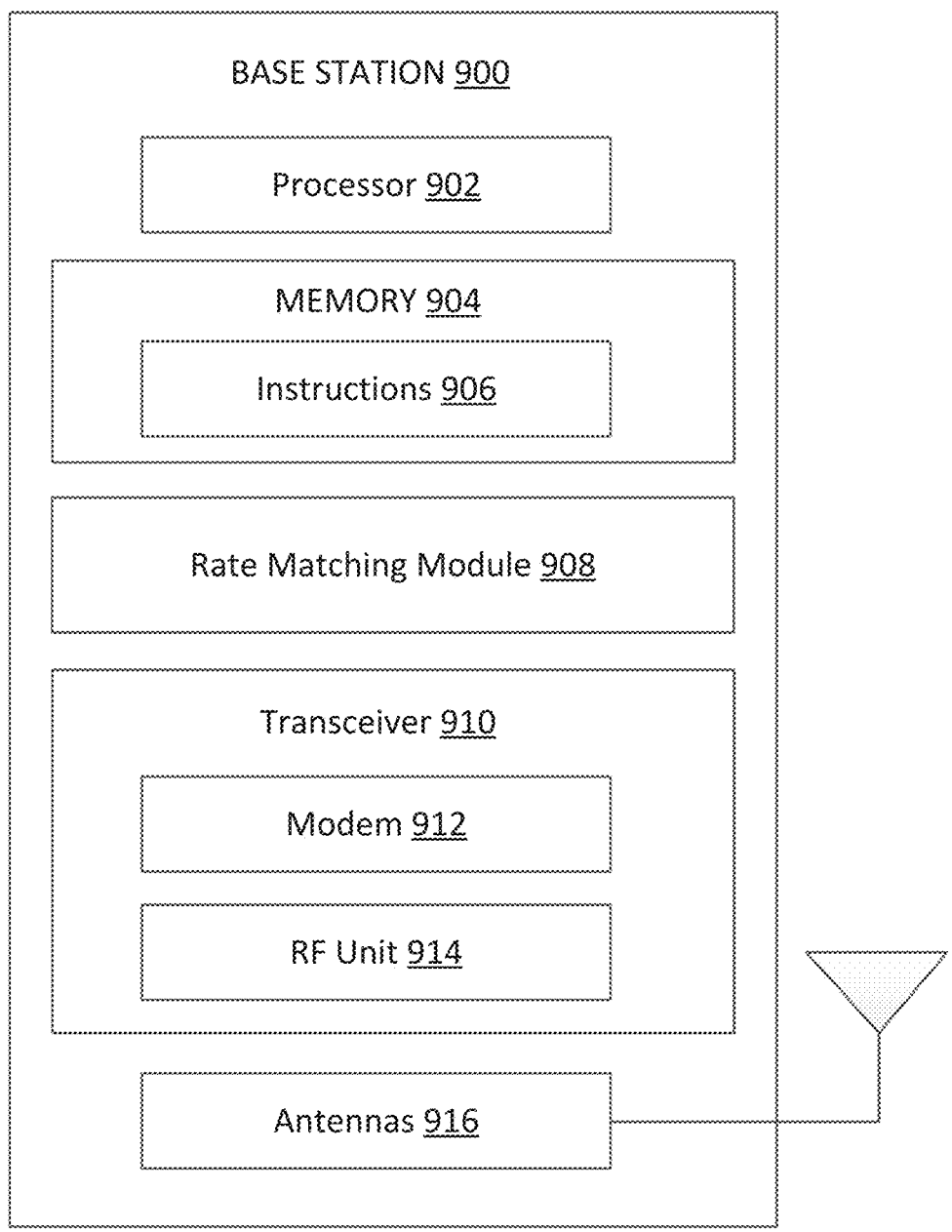
FIG. 9 is a block diagram of an exemplary base station (BS) according to some aspects of the present disclosure.

FIG. 9 is a block diagram of an exemplary BS 900 according to some aspects of the present disclosure. The BS 900 may be a BS 105 in the network 100 as discussed above in FIG. 1. A shown, the BS 900 may include a processor 902, a memory 904, an Rate matching module 908, a transceiver 910 including a modem subsystem 912 and a RF unit 914, and one or more antennas 916. These elements may be coupled with one another. The term "coupled" may refer to directly or indirectly coupled or connected to one or more intervening elements. For instance, these elements may be in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 904 may include a non-transitory computer-readable medium. The memory 904 may store instructions 906. The instructions 906 may include instructions that, when executed by the processor 902, cause the processor 902 to perform operations described herein, for example, aspects of FIGS. 3-7 and 11. Instructions 906 may also be referred to as code, which may be interpreted broadly to include any type of computer-readable statement(s) as discussed above.

The Rate matching module 908 may be implemented via hardware, software, or combinations thereof. For example, the Rate matching module 908 may be implemented as a processor, circuit, and/or instructions 906 stored in the memory 904 and executed by the processor 902. In some instances, the Rate matching module 908 can be integrated within the modem subsystem 912. For example, the Rate matching module 908 can be implemented by a combination of software components (e.g., executed by a DSP or a general processor) and hardware components (e.g., logic gates and circuitry) within the modem subsystem 912.

The Rate matching module 908 may be used for various aspects of the present disclosure, for example, aspects of aspects of FIGS. 3-7 and 10. The Rate matching module 908 can be configured to rate match, based on a rate matching pattern indicating a plurality of reserved resource elements (REs), a downlink (DL) communication channel. In some instances, the Rate matching module 908 may be configured to rate match a PDSCH around the plurality of reserved REs, for example. The Rate matching module 908 may rate match the PDSCH around one or more reserved REs that are associated with one or more signals from a neighboring cell associated with a different RAT. For example, the Rate matching module 908 may rate match around a plurality of REs associated with a LTE CRS from a neighboring LTE cell.

The Rate matching module 908 can be further configured to, transmit to a UE on one or more antenna ports, a DL communication in the rate matched DL communication channel. For example, the Rate matching module 908 may transmit DL data in the rate matched PDSCH. The Rate matching module 908 may be configured to transmit a DL shared channel (DL-SCH) and/or a paging channel (PCH), for example. In some aspects, the Rate matching module 908 is configured to transmit one or more transport blocks (TBs) in the rate matched PDSCH. The TBs may be further rate matched based on an available number of resources.

The Rate matching module 908, may be further configured to transmit, on the one or more antenna ports used to transmit the DL communication, one or more signals in the plurality of reserved REs. In some aspects, the Rate matching module 908 is configured to transmit one or more IQ signals or symbols. The Rate matching module 908 may generate or prepare the IQ signals using a same transmit configuration used to prepare the DL communication. For example, the Rate matching module 908 may use a same precoding matrix and power configuration to generate and transmit the IQ signals on the same one or more antenna ports used to transmit the DL communication. In some aspects, the Rate matching module 908 may be configured to transmit at least a portion of the DL communication simultaneously with the IQ signals.

In some aspects, the Rate matching module 908 may be configured to transmit one or more reference signals that can be used by a UE for channel estimation. In some aspects, the Rate matching module 908 may determine or generate the reference signals based on at least one of: the one or more reference ports, a cell identifier associated with the BS, or a frequency shift (e.g., vshift) associated with the reserved REs. In other aspects, the Rate matching module 908 is configured to transmit a repetition of the of one or more symbols of the DL communication channel.

As shown, the transceiver 910 may include the modem subsystem 912 and the RF unit 914. The transceiver 910 can be configured to communicate bi-directionally with other devices, such as the UEs 115 and/or 800, another BS 105, and/or another core network element. The modem subsystem 912 may be configured to modulate and/or encode data according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., SSBs, RMSI, MIB, SIB, FBE configuration, PRACH configuration PDCCH, PDSCH, RRC configurations and messages) from the modem subsystem 912 (on outbound transmissions) or of transmissions originating from another source, such as a UE 115. RF unit 914 can include circuitry such as analog to digital converters, digital to analog converters, filters, amplifiers, etc. The RF unit 914 may be further configured to perform analog beamforming in conjunction with the digital beamforming. Although shown as integrated together in transceiver 910, the modem subsystem 912 and/or the RF unit 914 may be separate devices that are coupled together at the BS 105 to enable the BS 105 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices and provide the received data messages for processing and/or demodulation at the transceiver 910. The transceiver 910 may provide the demodulated and decoded data (e.g., PUCCH control information, PRACH signals, PUSCH data) to the Rate matching module 908 for processing. The antennas 916 may include multiple antennas of similar or different designs in order to sustain multiple transmission links.

In an aspect, the BS 900 can include multiple transceivers 910 implementing different RATs (e.g., NR and LTE). In an aspect, the BS 900 can include a single transceiver 910 implementing multiple RATs (e.g., NR and LTE). In an aspect, the transceiver 910 can include various components, where different combinations of components can implement different RATs.

Figure 10:
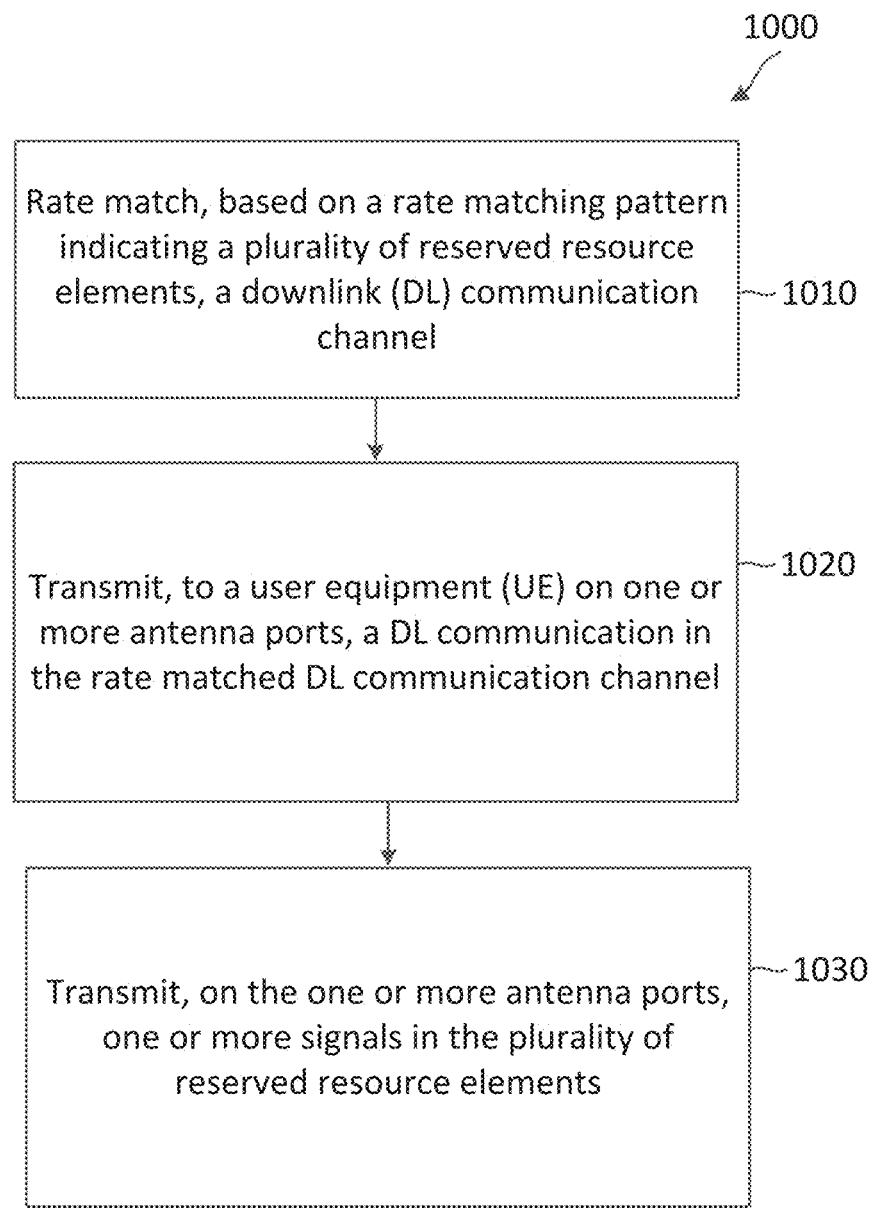
FIG. 10 is a flow diagram of a communication method according to some aspects of the present disclosure.

FIG. 10 is a flow diagram of a communication method 1000 according to some aspects of the present disclosure. Steps of the method 1000 can be executed by a computing device (e.g., a processor, processing circuit, and/or other suitable component) of an apparatus or other suitable means for performing the steps. For example, a BS, such as BSs 105, 305, 405, 505, 705 and/or 900, may utilize one or more components, such as the processor 902, the memory 904, the Rate matching module 908, the transceiver 910, and the one or more antennas 916, to execute the steps of method 1000. The method 1000 may employ similar mechanisms as described above with respect to FIGS. 3-7. As illustrated, the method 1000 includes a number of enumerated steps, but aspects of the method 1000 may include additional steps before, after, and in between the enumerated steps. In some aspects, one or more of the enumerated steps may be omitted or performed in a different order.

At block 1010, the BS rate matches, based on a rate matching pattern indicating a plurality of reserved resource elements (REs), a downlink (DL) communication channel. In some instances, block 1010 may include the BS rate matching a PDSCH, for example. The BS may rate match the PDSCH around one or more reserved REs that are associated with one or more signals from a neighboring cell associated with a different RAT. For example, block 1010 may include an NR BS rate matching around a plurality of REs associated with a LTE CRS from a neighboring LTE cell. The BS may utilize one or more components, such as the processor 902, the memory 904, the Rate matching module 908, the transceiver 910, and the one or more antennas 916, to execute the actions of block 1010.

At block 1020, the BS transmits, to a UE on one or more antenna ports, a DL communication in the rate matched DL communication channel. For example, the BS may transmit DL data in the rate matched PDSCH. Transmitting the DL data may include transmitting a DL shared channel (DL-SCH) and/or a paging channel (PCH), for example. In some aspects, transmitting the DL data may include transmitting one or more transport blocks (TBs), which may be further rate matched based on an available number of resources. The BS may utilize one or more components, such as the processor 902, the memory 904, the Rate matching module 908, the transceiver 910, and the one or more antennas 916, to execute the actions of block 1020.

At block 1030, the BS transmits, on the one or more antenna ports used to transmit the DL communication, one or more signals in the plurality of reserved REs. In some aspects, transmitting the DL communication may include transmitting one or more IQ signals or symbols. The BS may generate or prepare the IQ signals using a same transmit configuration used to prepare the DL communication. For example, the BS may use a same precoding matrix and power configuration to generate and transmit the IQ signals on the same one or more antenna ports used to transmit the DL communication. In some aspects, the BS transmits at least a portion of the DL communication simultaneously with the IQ signals. The BS may utilize one or more components, such as the processor 902, the memory 904, the Rate matching module 908, the transceiver 910, and the one or more antennas 916, to execute the actions of block 1030.

In some aspects, transmitting the one or more signals may include transmitting one or more reference signals that can be used by the UE for channel estimation. In some aspects, the BS may determine or generate the reference signals based on at least one of: the one or more reference ports, a cell identifier associated with the BS, or a frequency shift (e.g., vshift) associated with the reserved REs. In other aspects, transmitting the one or more signals may include transmitting a repetition of the of one or more symbols of the DL communication channel. The UE may use the repeated symbols to facilitate decoding of the received DL communication channel, for example.

Figure 11:
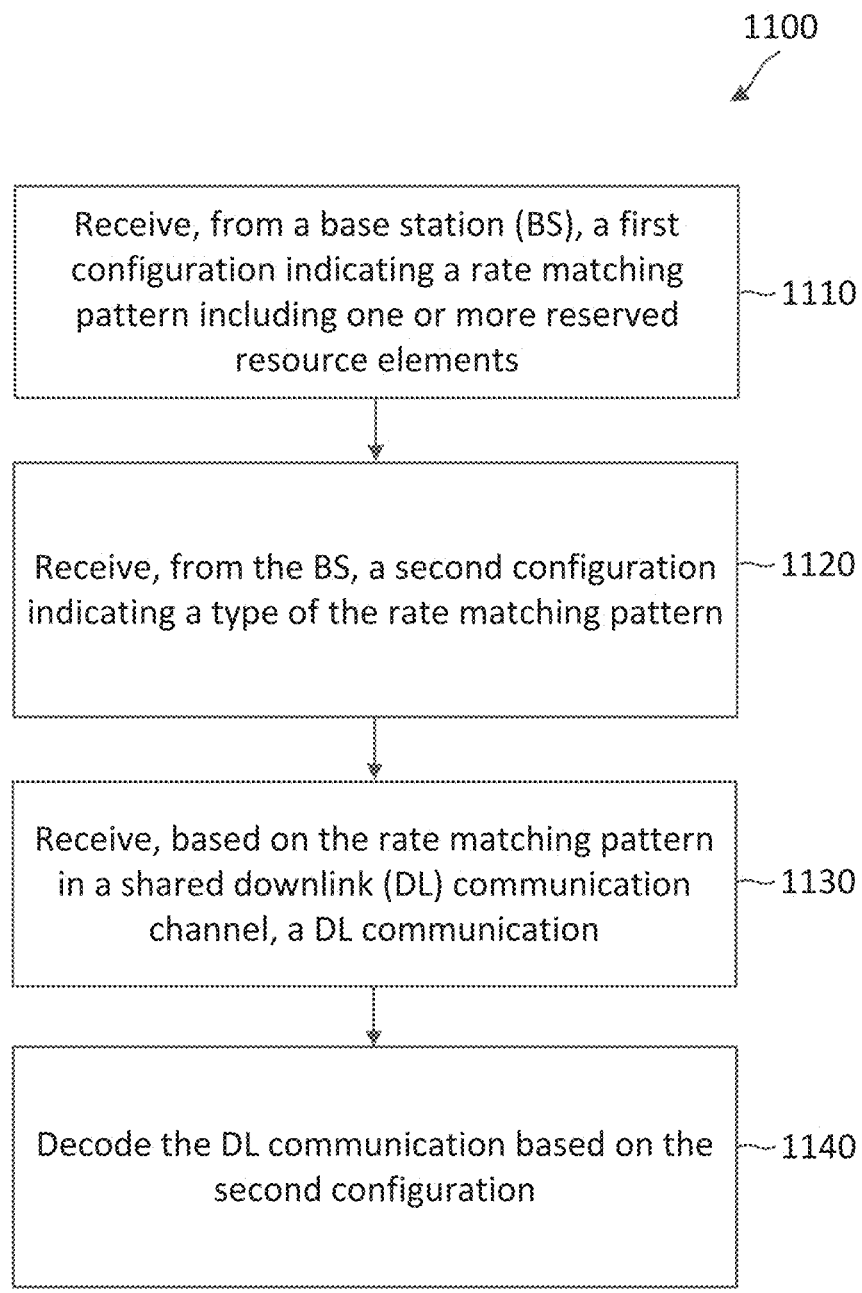
FIG. 11 is a flow diagram of a communication method according to some aspects of the present disclosure.

FIG. 11 is a flow diagram of a communication method 1100 according to some aspects of the present disclosure. Steps of the method 1100 can be executed by a computing device (e.g., a processor, processing circuit, and/or other suitable component) of an apparatus or other suitable means for performing the steps. For example, a UE, such as the UEs 115, 415, 515, 715, and/or 800, may utilize one or more components, such as the processor 802, the memory 804, the Rate matching module 808, the transceiver 810, and the one or more antennas 816, to execute the steps of method 1100. The method 1100 may employ similar mechanisms as described above with respect to FIGS. 3-7. As illustrated, the method 1100 includes a number of enumerated steps, but aspects of the method 1100 may include additional steps before, after, and in between the enumerated steps. In some aspects, one or more of the enumerated steps may be omitted or performed in a different order.

At block 1110, the UE receives, from a BS, a first configuration indicating a rate matching pattern including one or more reserved resource elements. In some aspects, block 1110 may include the UE receiving one or more RRC messages including a rate matching configuration, where the rate matching configuration indicates the rate matching pattern. For example, the RRC message may indicate that the rate matching pattern is for LTE CRS rate matching, and may indicate the frequency and/or time resources associated with the CRS signals. The UE may utilize one or more components, such as the processor 802, the memory 804, the Rate matching module 808, the transceiver 810, and the one or more antennas 816, to execute the actions of block 1110.

At block 1120, the UE receives, from the BS, a second configuration indicating a type of the rate matching pattern. In some aspects, block 1120 includes the BS transmitting one or more RRC messages indicating the type of the rate matching pattern. For example, an RRC message may include a field indicating whether the rate matching pattern is a first type or a second type. In some aspects, the UE determines, based on the rate matching pattern type, whether and how to use the one or more signals transmitted at block 1120. The UE may utilize one or more components, such as the processor 802, the memory 804, the Rate matching module 808, the transceiver 810, and the one or more antennas 816, to execute the actions of block 1120.

At block 1130, the UE receives, based on the rate matching pattern in a shared DL communication channel, a DL communication. In some aspects, the UE receives the DL communication in a PDSCH. The PDSCH may be rate matched around one or more reserved REs, as explained above. The one or more reserved REs may be associated with LTE CRS from a neighboring cell. In some aspects, block 1130 further includes the UE receiving one or more additional signals in the reserved REs. The one or more additional signals may be used in block 1140, as explained further below. For example, the one or more additional signals may include reference signals the UE may use to estimate the DL communication channel. In another example, the one or more additional signals may include a repetition of a portion of the DL communication. For example, the one or more signals may include a repeat of one or more REs in the DL communication channel that precede the reserved REs. The UE may utilize one or more components, such as the processor 802, the memory 804, the Rate matching module 808, the transceiver 810, and the one or more antennas 816, to execute the actions of block 1130.

At block 1140, the UE decodes the DL communication based on the second configuration. In this regard, the UE may receive one or more signals including a repeat of a portion of the DL communication, as explained above. In some aspects, the repeat of the portion of the DL communication may include one or more parity bits that can be used by the UE to decode the DL communication. The UE may determine to use the one or more parity bits based on the type of the rate matching pattern indicated in the second configuration. For example, the second configuration may indicate, to the UE, that the rate matching pattern has a second type. The UE may then determine, based on the second type of the rate matching pattern, to use the parity bits to decode the DL communication in the received PDSCH. The UE may utilize one or more components, such as the processor 802, the memory 804, the Rate matching module 808, the transceiver 810, and the one or more antennas 816, to execute the actions of block 1140.

Exemplary Aspects of the Disclosure

Aspect 1. A method for wireless communication performed by a base station (BS), the method comprising: rate matching, based on a rate matching pattern indicating a plurality of reserved resource elements, a downlink DL communication channel; transmitting, to a user equipment (UE) on one or more antenna ports, a DL communication in the rate matched DL communication channel; and transmitting, on the one or more antenna ports, one or more signals in the plurality of reserved resource elements.

Aspect 2. The method of aspect 1, wherein the rate matching pattern is based on a plurality of periodic reference signals associated with a first radio access technology (RAT), and wherein the UE is associated with a second RAT different from the first RAT.

Aspect 3. The method of any of aspects 1-2, further comprising: transmitting, to the UE, a first configuration indicating the rate matching pattern; and transmitting, to the UE, a second configurating indicating whether the rate matching pattern is associated with a first type or a second type.

Aspect 4. The method of aspect 3, wherein the first type of rate matching pattern configures the UE to rate match around the reserved resource elements, and wherein the second type of rate matching pattern: configures the UE to rate match around the reserved resource elements; and indicates a type of the one or more signals transmitted in the plurality of reserved resource elements.

Aspect 5. The method of any of aspects 1-5, wherein the transmitting the DL communication channel and the transmitting the one or more signals are based on a same transmit configuration.

Aspect 6. The method of aspect 5, wherein the transmit configuration includes a precoding matrix and a power configuration.

Aspect 7. The method of any of aspects 1-6, wherein the transmitting the one or more signals comprises transmitting a repetition of a plurality of symbols of the DL communication channel.

Aspect 8. The method of any of aspects 1-6, wherein the transmitting the one or more signals comprises transmitting one or more reference signals.

Aspect 9. The method of aspect 8, wherein the one or more reference signals is based on at least one of: the one or more antenna ports; a cell identifier associated with the BS; or a frequency shift associated with the one or more reference signals.

Aspect 10. The method of any of aspects 1-9, wherein the transmitting the DL communication comprises transmitting one or more DL communications simultaneously with the one or more signals in the plurality of reserved resource elements.

Aspect 11. A method for wireless communication performed by a user equipment (UE), the method comprising: receiving, from a base station (BS), a first configuration indicating a rate matching pattern including one or more reserved resource elements; receiving, from the BS, a second configuration indicating a type of the rate matching pattern; receiving, based on the rate matching pattern in a shared downlink (DL) communication channel, a DL communication; and decoding the DL communication based on the second configuration.

Aspect 12. The method of aspect 11, further comprising: receiving, in the one or more reserved resource elements, a reference signal; and estimating the shared DL communication channel based on the reference signal.

Aspect 13. The method of aspect, further comprising: receiving, in the one or more reserved resource elements, a portion of the DL communication, wherein the decoding the DL communication based on the second configuration comprises decoding the DL communication based on the portion of the DL communication.

Aspect 14. The method of aspect 13, wherein the portion of the DL communication comprises a repetition of one or more symbols of the DL communication.

Aspect 15. A base station (BS) comprising a processor and a transceiver, wherein the processor and the transceiver are configured to perform the method of any one of aspects 1-10.

Aspect 16. A user equipment (UE) comprising a processor and a transceiver, wherein the processor and the transceiver are configured to perform the method of any one of aspects 11-14.

Aspect 17. A non-transitory, computer-readable medium having program code recorded thereon, wherein the program code comprises instructions executable by one or more processors to cause a base station (BS) to perform the method of any one of aspects 1-10.

Aspect 18. A non-transitory, computer-readable medium having program code recorded thereon, wherein the program code comprises instructions executable by one or more processors to cause a user equipment (UE) to perform the method of any one of aspects 11-14.

Aspect 19. A base station (BS) comprising means for performing the method of any one of aspects 1-10.

Aspect 20. A user equipment (UE) comprising means for performing the method of any one of aspects 11-14.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method for wireless communication performed by a base station (BS), the method comprising:
   rate matching, based on a rate matching pattern indicating a plurality of reserved resource elements, a downlink (DL) communication channel, wherein the DL communication channel is associated with a first radio access technology (RAT);
   transmitting, to a user equipment (UE) on one or more antenna ports, a DL communication in the rate matched DL communication channel; and
   transmitting, on the one or more antenna ports, one or more reference signals in the plurality of reserved resource elements, wherein the one or more reference signals are associated with a second RAT different from the first RAT, and wherein the transmitting the DL communication and the transmitting the one or more reference signals are based on a same transmit configuration.

2. The method of claim 1,
   wherein the rate matching pattern is based on a plurality of periodic reference signals associated with the first RAT, and
   wherein the UE is associated with the second RAT.

3. The method of claim 1, further comprising:
   transmitting, to the UE, a first configuration indicating the rate matching pattern; and
   transmitting, to the UE, a second configurating indicating whether the rate matching pattern is associated with a first type or a second type.

4. The method of claim 3,
   wherein the first type of rate matching pattern configures the UE to rate match around the reserved resource elements, and
   wherein the second type of rate matching pattern:
      configures the UE to rate match around the reserved resource elements; and
      indicates a type of the one or more signals transmitted in the plurality of reserved resource elements.

5. The method of claim 1, wherein the transmit configuration includes a precoding matrix and a power configuration.

6. The method of claim 1, wherein the transmitting the one or more signals comprises transmitting a repetition of a plurality of symbols of the DL communication channel.

7. The method of claim 1, wherein the transmitting the one or more signals comprises transmitting one or more reference signals.

8. The method of claim 7, wherein the one or more reference signals is based on at least one of:
   the one or more antenna ports;
   a cell identifier associated with the BS; or
   a frequency shift associated with the one or more reserved reference elements.

9. The method of claim 1, wherein the transmitting the DL communication comprises transmitting one or more DL communications simultaneously with the one or more signals in the plurality of reserved resource elements.

10. A base station (BS), comprising:
    a processor configured to:
       rate match, based on a rate matching pattern indicating a plurality of reserved resource elements, a downlink (DL) communication channel, wherein the DL communication channel is associated with a first radio access technology (RAT); and a transceiver configured to:
   transmit, to a user equipment (UE) on one or more antenna ports, a DL communication in the rate matched DL communication channel; and
   transmit, on the one or more antenna ports, one or more reference signals in the plurality of reserved resource elements, wherein the one or more reference signals are associated with a second RAT different from the first RAT, and wherein the transmitting the DL communication and the transmitting the one or more reference signals are based on a same transmit configuration.

11. The BS of claim 10,
   wherein the rate matching pattern is based on a plurality of periodic reference signals associated with the first RAT, and
   wherein the UE is associated with the second RAT.

12. The BS of claim 10, wherein the transceiver is further configured to:
   transmit, to the UE, a first configuration indicating the rate matching pattern; and
   transmit, to the UE, a second configurating indicating whether the rate matching pattern is associated with a first type or a second type.

13. The BS of claim 12,
   wherein the first type of rate matching pattern configures the UE to rate match around the reserved resource elements, and
   wherein the second type of rate matching pattern:
      configures the UE to rate match around the reserved resource elements; and
      indicates a type of the one or more signals transmitted in the plurality of reserved resource elements.

14. The BS of claim 10, wherein the transmit configuration includes a precoding matrix and a power configuration.

15. The BS of claim 10, wherein the transceiver configured to transmit the one or more signals comprises the transceiver configured to:
   transmit a repetition of a plurality of symbols of the DL communication channel.

16. The BS of claim 10, wherein the transceiver configured to transmit the one or more signals comprises transmitting one or more reference signals.

17. The BS of claim 16, wherein the one or more reference signals are based on at least one of:
   the one or more antenna ports;
   a cell identifier associated with the BS; or
   a frequency shift associated with the one or more reserved resource elements.

18. The BS of claim 10, wherein the transmitting the DL communication comprises transmitting one or more DL communications simultaneously with the one or more signals in the plurality of reserved resource elements.

* * * * *